United States Patent [19]

Coffield

[11] 4,187,770
[45] Feb. 12, 1980

[54] POTATO CHIP COOKING APPARATUS

[76] Inventor: Harold M. Coffield, 41120 N. 15th St. West, Palmdale, Calif. 93550

[21] Appl. No.: 910,458

[22] Filed: May 30, 1978

[51] Int. Cl.² ............................................. A47J 37/12
[52] U.S. Cl. ...................................... 99/353; 99/407; 241/92; 426/438; 426/518
[58] Field of Search ................ 99/413, 415, 352, 353, 99/407; 241/92; 83/719, 355, 356.3, 856, 703; 426/464, 523, 473, 518, 637, 438

[56] References Cited

U.S. PATENT DOCUMENTS

| | | | |
|---|---|---|---|
| 1,531,256 | 3/1925 | Morrow | 99/353 |
| 1,666,019 | 4/1928 | McCarthy | 99/353 |
| 1,994,909 | 3/1935 | Ehrgott | 99/413 |
| 2,186,345 | 1/1940 | Reiderbach | 99/353 |
| 2,504,110 | 4/1950 | Davis | 99/353 |
| 2,853,243 | 9/1958 | Bert | 241/92 |
| 3,280,723 | 10/1966 | Hughes | 99/353 |
| 3,892,365 | 7/1975 | Verdun | 241/92 |
| 3,985,304 | 10/1976 | Sontheimer | 241/92 |

FOREIGN PATENT DOCUMENTS 1082552 12/1954 France ......................................... 99/353

Primary Examiner—Billy J. Wilhite
Attorney, Agent, or Firm—Roger A. Marrs

[57] ABSTRACT

An apparatus for slicing and cooking potatoes in a chip form is disclosed herein having a cylindrical base with electrical heating elements in the sidewall thereof for holding a quantity of cooking oil. A removable basket is immersed in the cooking oil and is disposed directly beneath a potato slicing mechanism. The mechanism is operably carried in a pivoting lid and includes a rotating slicing blade driven by a motor. A potato hopper carried on the lid includes a plunger for feeding a raw potato to a slicing table or ledge in registry with an opening for passing potato slices into the cooking oil beneath after cutting by the blade.

1 Claim, 4 Drawing Figures

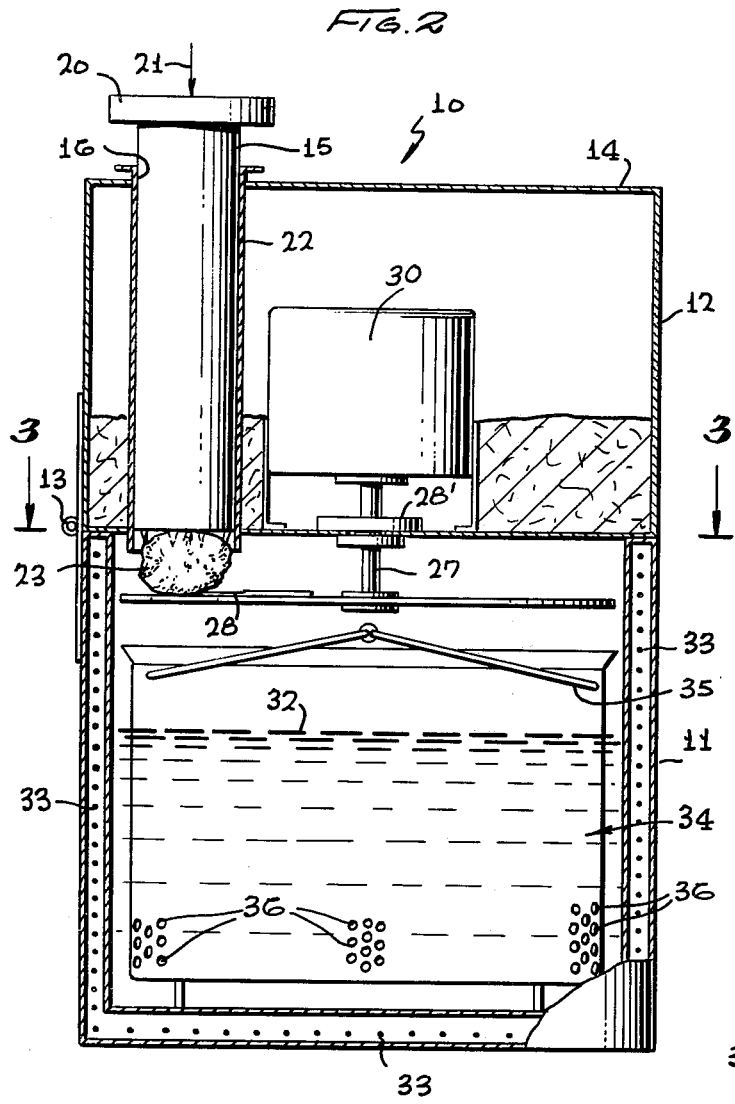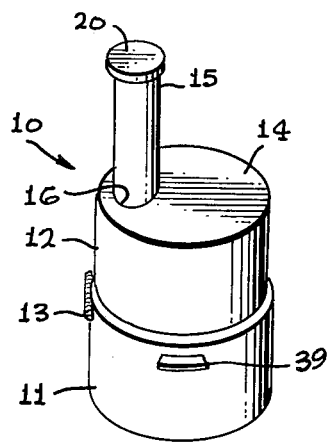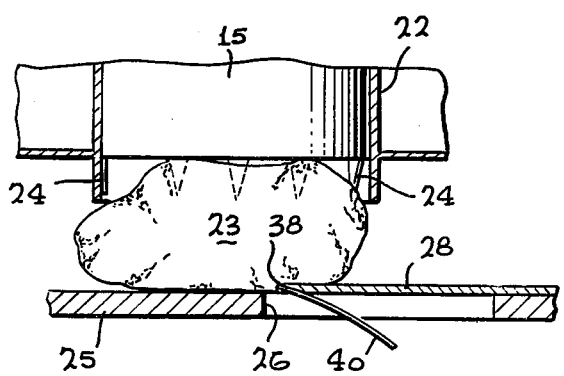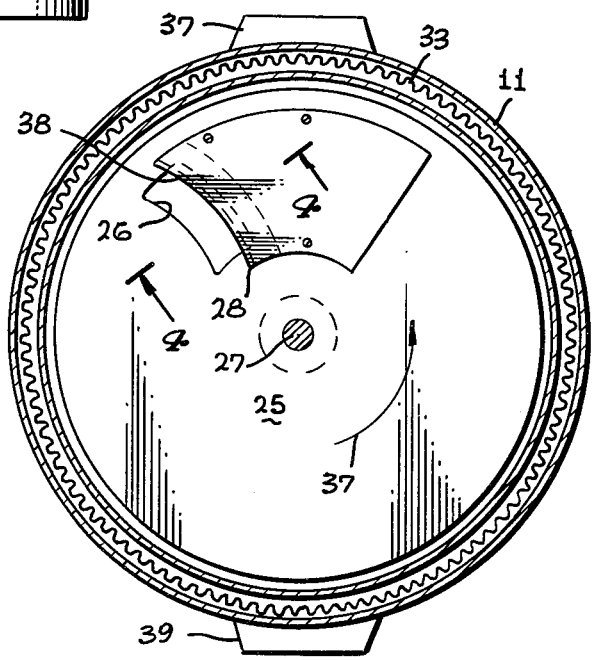

POTATO CHIP COOKING APPARATUS

BACKGROUND OF THE INVENTION

1. Field of the Invention

This invention relates to potato cooking devices and more particularly to a novel portable potato chip cooker incorporating a potato feeder, slicer and cooking vat in a single unitary construction.

2. Description of the Prior Art

In the culinary arts, it has been a typical procedure to slice raw potatoes into a plurality of thin potato discs which are subsequently introduced to a hot vat of cooking oil so that the discs are cooked and the result is a potato chip which is crispy and of a substantial golden color. Many devices have been developed for automatically conducting this procedure and some of the prior art devices are disclosed in U.S. Pat. Nos. 3,218,959; 2,911,903; 2,406,769 and 1,666,019. Although these previous devices have been successful for their intended purposes, difficulties have been encountered due to the fact that the equipment is of an industrial type which is large and intended to process slicing and cooking of potato chips in substantial quantities. Consequently, the devices are relatively complex and include many parts and automatic features which tend to increase the cost of the equipment as well as its complexity.

Therefore, a long standing need has existed to provide a potato cooking apparatus which is simple to assemble and operate and one which is inexpensive to construct and purchase. Furthermore, the need includes the requirement that the cooker be of small physical size so that it may be placed on a table counter or top such that the device is readily usable in the ordinary home and kitchen. The compactness of the device requires that all of the elements necessary in feeding, slicing and cooking of the potato be included so that small quantities of potatoes can be handled and at a more controlled time and condition.

SUMMARY OF THE INVENTION

Accordingly, the above problems and difficulties have been obviated by the present invention which provides a novel cooking apparatus for feeding, slicing and cooking potato chips which includes a base having a cylindrical sidewall constituting a vat for holding a quantity of cooking oil. The sidewall is provided with electrical heating elements for raising the temperature of the cooking oil to a desired level. A basket of perforated construction is immersed in the cooking oil and is directly beneath a cutting means for receiving slices of the potato. A cutting means and a feeding means is carried on a lid hingeably mounted to the sidewall of the vat and the cutting means includes a rotary slicing blade which engages a potato held on a ledge by the plunger of a feeding means which includes a hopper and a gravity fed plunger.

Therefore, it is among the primary objects of the present invention to provide a novel potato chip cooker or apparatus which is of a unitary construction including means for feeding a potato to a cutting means and means for cooking the potato after it has been sliced or cut.

Another object of the present invention is to provide a novel potato chip cooking apparatus which is of unitary construction and portable in nature so that it may be readily mounted on a table top for kitchen use.

Still another object of the present invention is to provide a novel potato chip cooking apparatus having relatively few parts which is easy to manufacture and which is relatively inexpensive to purchase.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a reduced perspective view of the novel potato chip cooking apparatus of the present invention;

FIG. 2 is an enlarged transverse cross-sectional view of the cooking apparatus shown in FIG. 1 illustrating the introduction of a potato to the slicing or cutting means preparatory to cooking;

FIG. 3 is a cross-sectional view of the cooking apparatus shown in FIG. 2 as taken in the direction of arrows 3—3 thereof; and FIG. 4 is a fragmentary sectional view of the slicing means as taken in the direction of arrows 4—4 of FIG. 3.

DESCRIPTION OF THE PREFERRED EMBODIMENT

Referring to FIG. 1, the novel potato chip cooker of the present invention is illustrated in the general direction of arrow 10 which includes a base or vat 11 in which a quantity of cooking oil is contained. On top of the vat 11, there is provided a lid 12 which is secured thereto by means of a hinge 13 so that the lid may be pivotally rotated to gain access to the interior of the device. The top 14 of the lid 12 includes a feeding means for introducing raw potatoes to the device and this means includes a gravity fed plunger 15 which is insertably received through an opening 16 in the lid 12. For introducing a raw potato to the cooking apparatus, the plunger 15 is manually removed and the potato is inserted into the opening which comprises an elongated sleeve. The plunger is inserted on top of the potato and either through gravity or through manual pressure, the potato is urged into a slicing or cutting means.

Referring now in detail to FIG. 2, it can be seen that the plunger 15 includes a pad 20 on the top thereof which may be engaged by the hand of the user for exerting a downward pressure in the direction of arrow 21. The plunger 15 is slidably received within the opening of a sleeve 22 and the plunger 15 rests on top of a raw potato indicated by numeral 23. Numeral 24 indicates potato gripping teeth downwardly depending from the end of the plunger 15 so as to hold the potato in position during the cutting operation. The potato rests on a ledge, table or platform 25 adjacent an opening or aperture 26 therein adapted to pass slices of the potato therethrough.

It can be seen that the cutting means includes the platform 25 and that the platform is carried on the end of a drive shaft 27 so that the platform will rotate accordingly. A cutting blade 28 is fixedly attached to the platform 25 and a cutting edge projects over the opening 26 to engage with the potato 23. The platform and therefore the cutter is rotated via the drive shaft 27 which is mounted in a suitable bearing 28' and is driven via an electrical motor 30. It can be seen that the feeding mechanism and the cutting means are carried on the lid 12 and that these means will rotate when the lid is pivoted on the hinge 13.

Immediately below the slicing or cutting means, there is provided a quantity of cooking oil indicated by the numeral 32 which is contained within the sidewalls of the vat 11. It can be seen that the sidewall for the vat 11 is provided with a plurality of electrical wire coils such as is indicated by the numeral 33 which constitute a resistance heating means for raising the temperature of the cooking oil 32. The resistance or electrical heating means is not only in the sidewall of the vat 11 but is also located in the bottom thereof so that uniform heating and therefore control of cooking temperature is more readily achieved. A basket 34 is carried within the confines of the vat 11 and is partially submerged within the cooking oil 32. The opening of the basket is directly under the opening 26 of the cutting means so that the potato cuttings will not only drop immediately into the cooking oil but will drop into the basket 34. The basket includes a handle 35 so that upon the termination of proper cooking time, the lid 12 may be pivoted and the handle 35 may be grasped by the user so that the basket may be removed containing the cooked potatoes. The cooking oil drips or passes through the plurality of perforations in the basket 34 and a group of the perforations is indicated by the numeral 36.

Referring now in detail to FIG. 3, it can be seen that the vat 11 further includes a pair of handles 37 and 39 which may be used to transport the device from one place to another. Also, FIG. 3 illustrates the opening 26 in the platform 25 which rotates in a counter clockwise direction as indicated by arrow 37'. The cutter or blade 28 is illustrated with its cutting edge 38 over the opening 26. Therefore, it can be seen that the potato 23 will rest on the solid part of the platform 25 until the opening 26 has been reached at which time the cutter blade 38 will engage the potato and slice a portion thereof from the bulk and the portion will drop through the opening 26.

Referring now in detail to FIG. 4, it can be seen that a typical potato is being sliced by the cutter edge 38 when the rotating platform 25 brings the blade into contact with the potato. A slice of the potato, such as a potato chip, is indicated by numeral 40 and is illustrated as dropping through the opening 26 where it will fall into the cooking oil 32.

Therefore, it can be seen that the cooking apparatus of the present invention provides a novel combined feeding means, slicing means and cooking means for producing a variety of potato confectionaries such as potato chips and shoestring potatoes. The device is portable since it may be moved about by the user by grasping the handles 37 and 39 and it may be placed on top of a work surface such as a kitchen sink or table accordingly. The potato is introduced to the device by removing the plunger 15 from the sleeve 22 and inserting the potato in the opening provided. The plunger is reinserted into the sleeve 22 and forced down on top of the potato so as to force the potato into contact with the solid surface of the revolving platform 25. As the platform revolves, cutter 28 with its cutting edge 38 will engage with a portion of the potato and slice that portion therefrom which will drop through opening 26 into the cooking oil below. The potato portion will not only fall into the cooking oil 32 but will be within the confines of basket 34 so that upon the completion of cooking, the lid 12 may be pivoted out of the way along with the feeding means and cutting means to expose the basket for removal along with the cooked potato chips.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A potato chip cooking apparatus comprising the combination of;

a cylindrical vat for holding a quantity of cooking oil;

a basket having perforated sidewall disposed in said vat partially submerged in said cooking oil;

a lid hingably carried on said vat and coaxially disposed with respect to said vat so that said lid pivots away from said vat to expose said basket;

a feeder means carried on said lid for introducing a raw potato to said vat;

cutting means operably carried on said lid and downwardly depending therefrom for engaging said raw potato and slicing a portion thereof so as to drop into said basket and cooking oil therebeneath;

electrical means for operating said cutting means and for heating said cooking oil;

said cutting means includes a circular platform having an arcuate opening therein and a cutting blade carried on said platform adjacent said opening;

said platform coupled to said electrical means in driving relationship so as to foricbly urge said potato portion;

said feeder means includes a sleeve mounted on said lid;

a plunger slidably carried in said sleeve and adapted to rest on top of said raw potato urging said raw potato into contact with said platform;

a plurality of prongs downwardly depending from one end of said plunger releasably engagable with said raw potato;

bracket means securing said electrical means for driving said platform to said lid;

handle means attached to said vat exteriorly for grasping by the user for moving said apparatus from place to place; and said rotating platform resides within the confines of said vat when said lid is closed on top of said vat.

* * * * *